C. S. MOORE.
SHOCK ABSORBING DEVICE.
APPLICATION FILED JUNE 14, 1911.

1,041,843.

Patented Oct. 22, 1912.

WITNESSES:

Charles S. Moore
INVENTOR.

BY Charles W. Lovett
ATTORNEY.

UNITED STATES PATENT OFFICE.

CHARLES S. MOORE, OF DANVERS, MASSACHUSETTS.

SHOCK-ABSORBING DEVICE.

1,041,843. Specification of Letters Patent. Patented Oct. 22, 1912.

Application filed June 14, 1911. Serial No. 633,175.

*To all whom it may concern:*

Be it known that I, CHARLES S. MOORE, a citizen of the United States of America, residing at Danvers, in the county of Essex and Commonwealth of Massachusetts, have invented a new and useful Shock-Absorbing Device for Use on Carriages, Automobiles, and Kindred Vehicles, of which the following is such a full, clear, and exact description as will enable others versed in the art to which it appertains to make and use my said invention, reference being had to the accompanying drawing, and to letters of reference marked thereon, which form a part of this specification, in explaining its nature.

My invention relates to shock absorbers intended to be used as an auxiliary to the carrying springs of vehicles and to the peculiar arrangement and construction of the component parts thereof.

The objects of my invention are 1st. To add a supplementary strength and support to the carrying springs of a vehicle. 2nd. To provide an improved means of checking the rebound of the carrying springs as the vehicle passes over a gully or other rough places. 3rd. To insure a shock absorbing device, light in weight yet efficient in service. 4th. To insure an easy, gliding and forward motion to the body of the vehicle as distinguished from the ordinary up and down jolt. And to provide other advantages and results some of which may be hereinafter referred to in connection with the description of the working parts.

I attain these objects as shown in the accompanying drawing, in which—

Figure 1:
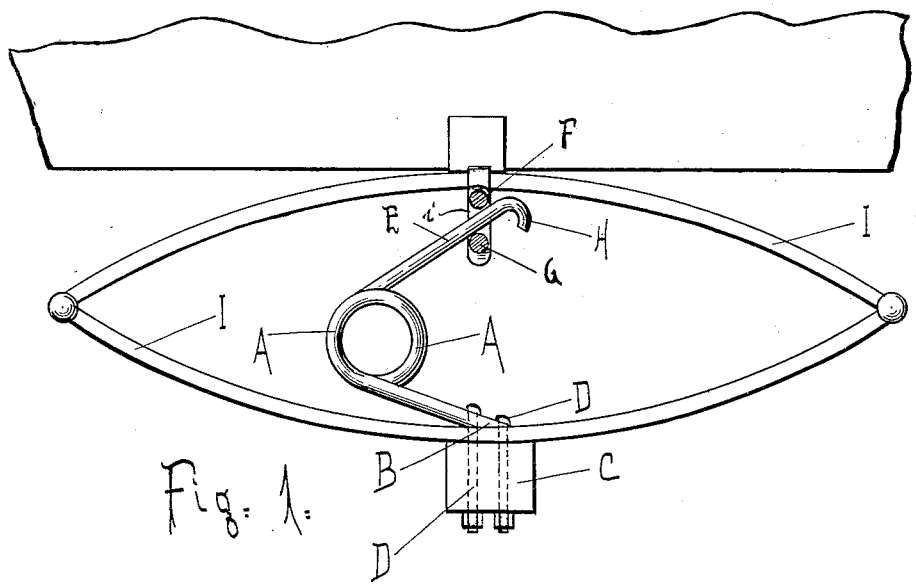
Figure 2:
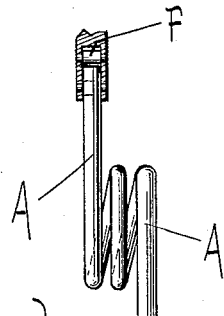

Figure 1 shows a side view of my device. Fig. 2 shows an end view thereof.

The carrying-spring I is of the usual elliptical type, comprising the two bow-shaped members, as shown.

My auxiliary spring preferably comprises, as shown, a central spiral or coil A and two terminals or arms E, E, the spring being advantageously disposed vertically inside the spring I, *i. e.*, between the bow-shaped members thereof, and with the two terminals E, E lying at less than a right-angle to each other. By this peculiar arrangement, I get the best results. The lower terminal E is suitably secured to the axle C of the vehicle, as by the bolts D. The upper terminal passes between two rollers F, G carried by a bracket or hanger *i* depending from the top bow-member of the spring I, and its free extremity carries a hook H, which, in the movement of the vehicle, engages the roller G when the rebound of the spring I carries said roller into contact with said hook. Thus, it is seen that by this means, I check any serious rebound of the spring I, which would tend to injure or break the same. It will be noted, also, that, in use, when the vehicle is moving, the rollers F and G slide up and down the upper arm or terminal E of the auxiliary spring, which insures the easy gliding motion which it is the object of my invention to attain.

It will be seen that my auxiliary spring serves a dual function namely: 1. It serves as a shock-absorber, *i. e.*, it prevents an undue compressive movement of the spring I, under shock and jar; and, 2, it serves to check the rebound or expansive movement of the spring I.

Having thus fully described my invention, what I claim as new and desire to secure by Letters Patent of the United States is:

1. The combination with a vehicle carrying-spring, of elliptical type, comprising two bow-shaped members, and provided with a bracket carrying rollers, of an auxiliary shock-absorbing spring disposed between said bow-shaped members and provided with a terminal reciprocating between said rollers.

2. The combination with a vehicle carrying-spring, provided with a bracket carrying rollers, of an auxiliary, spiral, shock-absorbing spring operatively associated with said carrying-spring and having a terminal reciprocating between said rollers.

3. The combination with a vehicle carrying spring, provided with a bracket carrying rollers, of an auxiliary, spiral, shock-absorbing spring operatively associated with said carrying-spring and having two terminals lying at less than a right angle to each other, one of said terminals reciprocating between said rollers.

4. In a road-vehicle, having an axle and a carrying-spring disposed between said axle and the vehicle-body and provided with a bracket carrying rollers, an auxiliary shock-absorbing spring operatively associated with said carrying-spring and having two terminals, one of said terminals reciprocating between said rollers and the other of said terminals being secured to said axle.

5. In a road-vehicle, having an axle and a carrying-spring disposed between said axle and the vehicle-body and provided with a bracket carrying rollers, an auxiliary, spiral, shock-absorbing spring operatively associated with said carrying-spring and having two terminals, one of said terminals reciprocating between said rollers and the other of said terminals being secured to said axle.

6. The combination with a vehicle-carrying spring provided with a bracket carrying rollers, of an auxiliary shock-absorbing spring operatively associated with said carrying-spring and provided with a terminal reciprocating between said rollers.

7. The combination with a vehicle carrying-spring provided with a bracket carrying rollers, of an auxiliary shock-absorbing spring operatively associated with said carrying-spring and provided with a terminal reciprocating between said rollers and carrying at its extremity a hook engageable with one of said rollers.

In testimony whereof I hereunto set my hand in the presence of two attesting witnesses.

CHARLES S. MOORE.

Witnesses:
   MAUDE M. MOORE,
   JOSEPH MERRILL.

Copies of this patent may be obtained for five cents each, by addressing the "Commissioner of Patents, Washington, D. C."